United States Patent [19]
Hill et al.

[11] Patent Number: 5,594,284
[45] Date of Patent: Jan. 14, 1997

[54] VEHICLE SECURITY DEVICE USING KEY DEVICE WHICH COMPLETES INTERRUPTED CIRCUITS

[75] Inventors: George H. Hill, Grasonville; Steve S. Sahebjam, Columbia, both of Md.

[73] Assignee: George Hill, Columbia, Md.

[21] Appl. No.: 321,034

[22] Filed: Oct. 6, 1994

[51] Int. Cl.⁶ .................................................. B60R 25/04
[52] U.S. Cl. .................................. 307/10.5; 70/DIG. 46; 180/287
[58] Field of Search .................................. 307/9.1–10.6; 180/287; 70/271, DIG. 46; 235/382.5, 492; 439/34, 59, 507; 340/542

[56] References Cited

U.S. PATENT DOCUMENTS

| | | | |
|---|---|---|---|
| 2,868,905 | 1/1959 | Meyer | 340/542 |
| 4,148,372 | 4/1979 | Schroeder | 307/10.5 |
| 5,440,177 | 8/1995 | Bellin et al. | 307/10.5 |
| 5,442,243 | 8/1995 | Bailey | 307/10.5 |

FOREIGN PATENT DOCUMENTS 2274678  3/1994  United Kingdom .................. 307/10.5

OTHER PUBLICATIONS

*Prolock* Brochure, Mar. 1995, Auto Security Systems.
*Immobiliser* Brochure, Nov. 1992, Quorum.

Primary Examiner—William M. Shoop, Jr.
Assistant Examiner—Richard T. Elms
Attorney, Agent, or Firm—Randy W. Lacasse

[57] ABSTRACT

A vehicle security system disables various electrical systems throughout the vehicle. A unique double-sided security key is used to complete the various circuits of the chosen electrical systems by matching physical codes on the key to that of an installed receiving unit mounted within or about the dashboard of a vehicle. The various combinations created by the coded key make a determination of how the various circuits are broken. The method of attempting to re-connect the circuits by trial and error is prohibitive to a would-be thief. The unit can be used to disable an automobile, boat, motorcycle, RV, etc. The device may include one or more blocking diodes within the circuits to produce false readings during attempted tampering.

21 Claims, 3 Drawing Sheets

VEHICLE SECURITY DEVICE USING KEY DEVICE WHICH COMPLETES INTERRUPTED CIRCUITS

FIELD OF INVENTION

The present invention relates to vehicular security systems and more particularly to a key-based security system for the selective enablement and disablement of vehicular electrical systems as a theft deterrent.

BACKGROUND OF THE INVENTION

The theft of automobiles, boats, motorcycles, RVs, and like vehicles has prompted the creation of an endless assortment of anti-theft devices. The primary problem associated with most of these devices is that would-be thieves quickly ascertain a method to defeat the effectiveness of the device. In addition, many anti-theft devices are unreliable, poor in quality, high in cost, difficult to use or require considerable time by the user/installer to implement and maintain.

The majority of anti-theft devices can be classified into three basic categories. The first category includes devices which physically immobilize a vehicle component, such as a steering wheel, locking mechanisms and/or the transmission. "The Club"™ is a prime example of a physical immobilization device. The second category involves intruder detection mechanisms which, upon intrusion, either actuate an alarm system (such as flashing lights, horn sounding, and the like) or otherwise disable an electrical system of the vehicle. The third category encompasses devices specifically directed to a method or apparatus for selectively enabling and disabling operational systems within the vehicle including, for example, the ignition, fuel systems, computer control systems, and similar electrical systems which are essential for proper operation of the vehicle. The present invention lies within this third category. More particularly, the present invention provides a security key system which enables specific electrical systems when a security key is properly introduced into the system, and disables the system when the key is removed therefrom.

The prior art is replete with methods and devices, such as security keys, for attempting to prevent theft or other unwanted access to automobiles and other vehicles. For example, U.S. Pat. No. 4,327,353 to Beard et al. provides for an electronic security system with an encoded security card. The card consists of a plurality of coded contacts on the upper side of the card. When the proper key is inserted into a female decoding reader it allows the system to function without tripping alarms.

U.S. Pat. No. 4,945,872 to Embry relates to a theft prevention apparatus comprising a disabling device for electronic circuits. The device includes a female connector and a male "key". The inwardly facing rear surface of the female connector features a plurality of outwardly projecting terminals for connection of electrical wires. The female connector is incorporated into the automobile ignition circuit by severing a predetermined group of wires. When the male connector is removed from the female connector, the vehicle is disabled. The device includes "dummy" wires to give false readings for tamper resistance.

U.S. Pat. No. 5,133,426 to Niriella et al. illustrates the use of anti-tamper circuitry wherein a security key is used to make various combinations of direct and indirect (i.e using relays) electrical circuit connections. Niriella et al. further provides for the use of false circuit connections not actually connected to electrical circuits.

U.S. Pat. No. 2,868,905 to Meyer discloses an electric lock intended for use as an ignition lock for an automotive vehicle which prevents unauthorized circuit closing. The device comprises a plurality of contacts, only predetermined ones of which close a desired circuit. The correct key will electrically connect the proper contacts.

The patent to Vandigriff (4,435,649) provides for a digital encoded key for an anti-theft circuit.

The patent to Vaughan et al. (4,871,886) illustrates a double-sided security key including a guide and biasing means.

The patent to Housman et al. (3,876,884) illustrates a double-sided security key with longitudinal contact connections. The key must be flipped over to use both sides.

The patent to Granholm et al. (4,298,792) provides for a security key with encoded contacts which is placed into a female receptor.

The patent to Jaulmes (4,331,013) provides for a two-sided magnetically encoded anti-theft security key which actuates switches located in a female receiving section.

The patent to Dimitriadis (3,797,936) provides for an electronic locking system with an encoded key having multiple encoding schemes.

The patent to Romano (4,755,799) illustrates a particular design of an electronic security card.

The present invention overcomes the deficiencies encountered in the prior art by providing a double sided security key not illustrated by the above prior art references. Further, the present double-sided security key employs unique coding structures which are concealed within the key for securely connecting one or more electrical circuits, unlike the Niriella and Embry patents noted above. Moreover, the present invention does not require various combinations of logic schemes, such as dummy wires, during the course of connecting electrical circuits, thereby creating false readings for anti-tamper purposes, which is the method of choice in Niriella and Embry.

SUMMARY OF THE INVENTION

Accordingly, it is an object of the present invention to provide a method and device for protecting a vehicle from theft or other unwanted access;

It is another object of the present invention to provide a device for making and breaking circuits comprising a male key and a female socket for said key, wherein a plurality of electrical contacts are present on the key and the socket;

It is an additional object of the present invention to provide electrical connections between each of said contacts on the key, thereby forming multiple pairs of connected contacts or circuits, wherein the pattern of electrical connections is selected by the installer from multiple connection combinations;

It is a further object of the present invention to provide a means to conceal the connections provided on the key with known materials and methods, such as plastic molding;

It is another object of the present invention to provide electrical connections between pairs of contacts on said female socket and one or more electrical circuits existing in said vehicle to be protected, wherein the choice of socket contact pairs is determined by the multiple pairs created on the male key in such a manner as to provide completed circuits when the male key is inserted in the socket;

It is a further object of the present invention to provide means for installing the socket on a surface of said vehicle (e.g. the dashboard, steering column, and the like) and inserting the key into the socket, thereby completing the multiple selected circuits and providing for electrical current of each circuit to flow through the key-and-socket device;

It is a further object of the present invention to provide an anti-theft device wherein the security key is encoded on both sides.

It is a further object of the present invention to provide for removing the key from the socket, thereby breaking said circuits, disabling vehicle operation, and protecting the vehicle from theft.

Additional objects, advantages and novel features of the present invention will be set forth in part in the description which follows, and in part will become apparent to those skilled in the art upon examination of the following specification or may be learned by practice of this invention.

These and other objects of the invention, as embodied and broadly described herein, are achieved by providing a vehicle security device which enables a user to disable multiple vehicle circuits including, for example, the ignition, starter motor, ground, engine control computer, automatic transmission, electronic fuel system, coil and the like. The present device is implemented in the form of a narrow "key" having a plurality of printed circuit fingers contacts on each side thereof. The key is inserted into a corresponding receiving female socket, which is then connected by paired wires to one or more of the vehicle's electrical circuits. Contacts in the female housing are not visible at the entry point of the female socket. Rather, they are buried at the back of the female housing. The terminal contacts, typically at least four on top (i.e. ceiling of the housing) and four on bottom (i.e. floor of the housing), are separated by less than sixty thousandths ($^{60}/_{1000}$) of an inch. Consequently, a thief's probe will short the terminal contacts from top to bottom, thereby blowing fuses and creating additional problems. With the present invention installed in a vehicle, the vehicle can not be push started, hot wired, or jump started. Only when the key is engaged in the female socket are the vehicle's electrical circuits enabled and is the vehicle operational. When the key is removed from the female socket, the vehicle electrical circuits are broken according to the hardware encoding schemes concealed within the key, thereby disabling vehicle operation.

A unique feature of the key of the present invention is that the insertion of the key does not complete the electrical circuits in a sequential one sided manner, but rather, the double-sided key provides a potential of more than four hundred (400) distinct combinations moving from side to side in a random "disorderly" pattern. In this manner, it is possible to interrupt the same vehicle electrical circuits in succeeding installations with completely different combinations. As a result, when the key is removed from the system, the likelihood of the vehicle being stolen or otherwise violated is significantly diminished. This result is due to the fact that a thief can not expend the necessary time to break the codes because of (1) the random and multiple possibilities provided by the missing male key, (2) the numerous possibilities existing in how to break the vehicles circuits and where to incur those breaks and (3) difficulty in accessing the proper connectors in the female socket due to the narrow separation of the top and bottom terminal contacts in the female housing.

Although the device of the present invention provides an almost unlimited number of possible random-coded keys, it is simple and inexpensive to manufacture and involves a relatively uncomplicated installation procedure. The installation procedure is dependent on possessing the actual key to be used in the security device, rather than knowing and implementing specific key coding sequences. In other words, the key's unique coding sequence remains with the manufacturer, and is not provided to either the installer or owner. As a result, the ultimate confidentiality of the coding sequence is maintained, thereby further diminishing the likelihood that the coding sequence of the key can become known to potential thieves. Rather, each key is provided with an alpha-numeric code identifying the coding sequence of the key, said alpha-numeric code being meaningless to anyone other than the manufacturer.

BRIEF DESCRIPTION OF THE DRAWINGS

The present invention will be better understood with reference to the appended drawing sheets, wherein.

DETAILED DESCRIPTION

The present invention relates to a vehicle security device which enables a user to disable one or more vehicle electrical circuits including, for example, the ignition, starter motor, ground, engine control computer, automatic transmission, electronic fuel system, coil and the like comprising a male key and a female socket, wherein complementary electrical contacts are present on the male key and the female socket. More particularly, the present invention comprises a male member in the form of a narrow "key" having a plurality of printed circuit fingers on each side thereof and a female socket having a plurality of terminal contacts located on the floor and ceiling thereof, the number of terminal contacts equaling the number of printed circuit fingers of the male key. One or more pairs of wires, exiting from the rear of the female housing, are connected to one or more of the vehicle's electrical circuits. When the key is engaged in the female socket, the vehicle's electrical circuits are enabled and the vehicle is operational. When the key is removed from the female socket, the vehicle electrical circuits are broken according to the hardware encoding schemes concealed within the key, thereby disabling vehicle operation.

Figure 1:
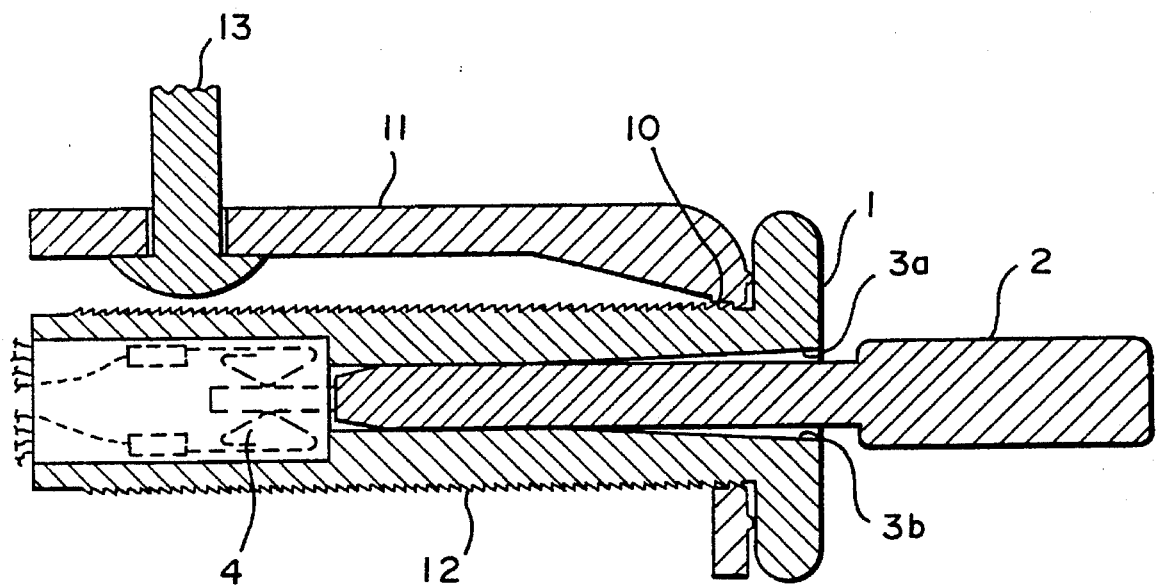
FIG. 1 illustrates a side view cut-away of the basic device with key inserted into female receiving housing including mounting structure.

Although the present invention contemplates the use of a plurality of printed circuit fingers and corresponding terminal contacts, it is to be understood that the present invention should not be limited to any specific number of wires or circuits. Rather, it is possible to incorporate any number of wires to break any number of circuits simultaneously. The number of combinations of codes, number of wires and number of circuits is only limited by space available on the male key and by the number of available electrical circuits in a vehicle. In a preferred embodiment of the present invention, the device provides for making and breaking four circuits, wherein eight or more compatible electrical contacts are present on the male key and on the female socket. Accordingly, solely for the purposes of illustration and advancing understanding of the invention, the present vehicle security device will be discussed in terms of the preferred embodiment. FIG. 1 illustrates the basic device of the present invention wherein female socket 1 is mounted in or near the dashboard of a vehicle. The female socket may be mounted in various locations or in various type vehicles, including, for example, automobiles, recreational vehicles (RVs), motorcycles, boats, and the like. The female socket housing may be mounted using a mounting bracket 11 as shown in FIG. 1 and described hereinafter.

Figure 2:
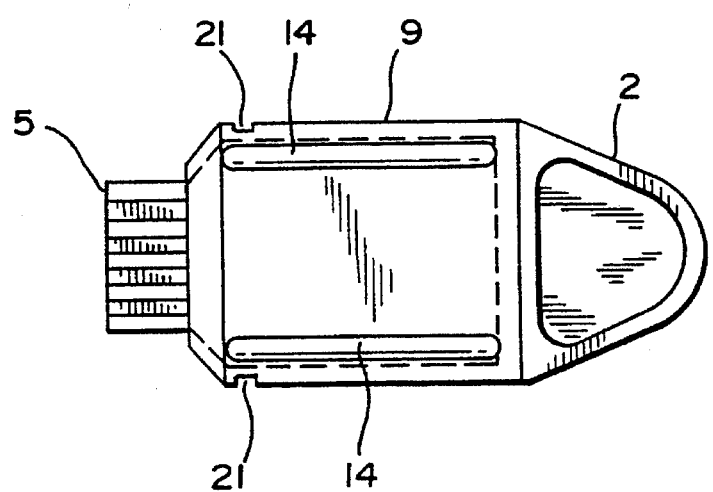
FIG. 2 illustrates the key.
Figure 4:
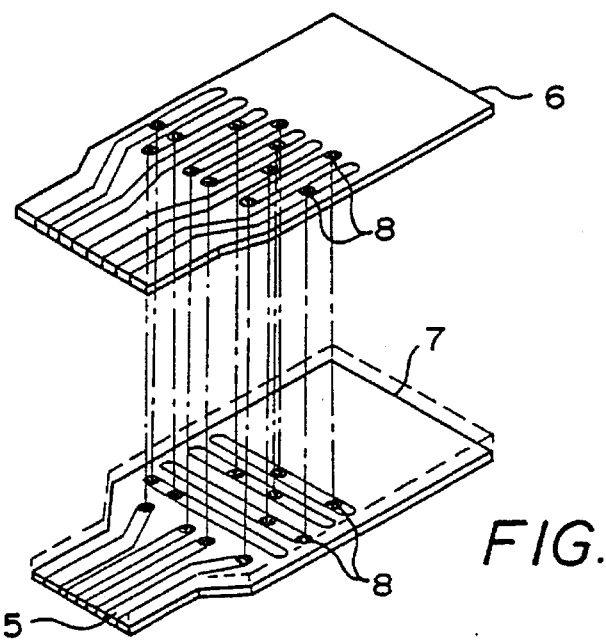
FIG. 4 illustrates an exploded view of a particular feed through hole connection for the double-sided circuit board.

FIG. 2 illustrates a top view of the male key 2 separated from the female housing 1 to show the longitudinal contacts 5 along the key. Socket 1 provides electrical connections between each of said contacts 5 on the key 2 and corresponding mating contacts 4 of the female socket, thereby forming pairs of connected contacts or circuits. As shown in FIG. 4, the key 2 is double sided, with longitudinal contacts of a top 6 and bottom 7 printed circuit board (PCB) connected together by a plurality of feed through holes 8 which are hot soldered using techniques as is known in the prior art. It is to be understood that FIG. 4 illustrates but one of many hundreds of possible side-to-side connections of contacts to form the encoded mating electrical pathways which will connect with the receiving paired contacts in the female receiving socket thereby completing the electrical circuits. The internal connections of the male key 2 are concealed by an end cap 9 using an integral one-piece plastic molding, as shown in FIG. 2.

A unique feature of the key of the present invention is that the insertion of the key does not complete the electrical circuits in a sequential one sided manner, but rather, in a disorderly, double-sided manner. Consequently, the double-sided key provides a potential of more than four hundred (400) distinct combinations moving from side to side in a random "disorderly" pattern. FIG. 4 illustrates one particular code connection scheme. The contacts printed on each circuit board, top 6 and bottom 7, may be connected from board to board, on the same board or any combination thereof. In this manner, it is possible to interrupt the same vehicle electrical circuits in succeeding installations with completely different combinations. Although there are more than four hundred (400) different potential male keys 2, all the female sockets 1 are of the same configuration. Further, although each male key printed circuit pins look identical, for any given key, it possesses but one of the more than four hundred (400) coding sequences, thereby providing more than four hundred potential codes to create and complete the four or more circuits from the eight (8) wires on the female connection. In other words, the design and configuration of the double-sided key of the present invention provides more than four hundred unique keys.

The printed circuitry key feed through hole connections 8, which function to code the key, are concealed by the end cover 9, as noted previously. The end cover is molded in one piece over the coded portion and is permanently affixed to the printed circuit board (PCB). Inasmuch as the end cover is permanently affixed, it is extremely unlikely that anyone could remove this end member without destroying the printed circuit schematic.

The female socket of the present invention comprises a housing 1 having a top or ceiling surface 3a and a bottom or floor surface 3b, said top and bottom surfaces being separated by less than sixty thousandths of an inch ($^{60}/_{1000}$"). In the preferred embodiment, four terminal contacts are located on the top surface 3a and four terminal contacts are located on the bottom surface 3b. The terminal contacts 4 in the female housing are not visible at the entry point of the female socket, but rather are located at the rear of the female housing. Since the terminal contacts essentially are "buried" at the rear of the housing, general and easy access to them is virtually eliminated.

The female housing containing the female socket may be installed in a vehicle by cutting through the dashboard panel or similar surface (not shown) and inserting the socket therein, such that the wires come through the dash interior. The selected location for installation should allow free access and should be clear of any existing wiring or other obstacles behind the female housing. Alternatively, as shown in FIG. 1, the female socket may be secured to any convenient surface of the vehicle, such as the dashboard or on or near the steering column. The housing is secured to the selected surface by means of a mounting bracket 11, which is used as a back-up plate in a dashboard mount. Molded serration 10 within the face opening of mounting bracket/back-up plate engage and lock the serration located on the outside of the female housing 12 when externally mounted on column or lower dash. When the female socket is mounted into the mounting bracket, the female socket itself hides the installation screw(s) 13, making it inaccessible after it is fully installed. As no faceplate mounting screws are needed on the cut through dash mount installation, more security is afforded to the device.

Figure 5:
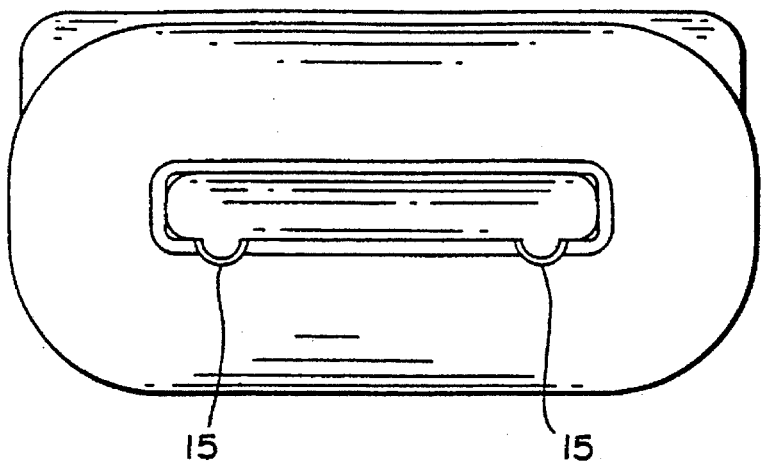
FIG. 5 illustrates the front facing of the female receiving housing.

Once the female socket has been installed or otherwise mounted to the vehicle, the insertion of the key into the socket completes one or more selected circuits and provides electrical current to each circuit which flows through the key-and-socket device. Removing the key from the socket breaks and disables the circuits, thereby preventing further vehicle operation and protecting the vehicle from theft. The key is guided in and out of the female housing by guide rails 14 as shown in FIG. 2. The female housing 1 has reciprocally mating guide grooves 15 as shown by the front view of the female housing in FIG. 5.

Figure 3:
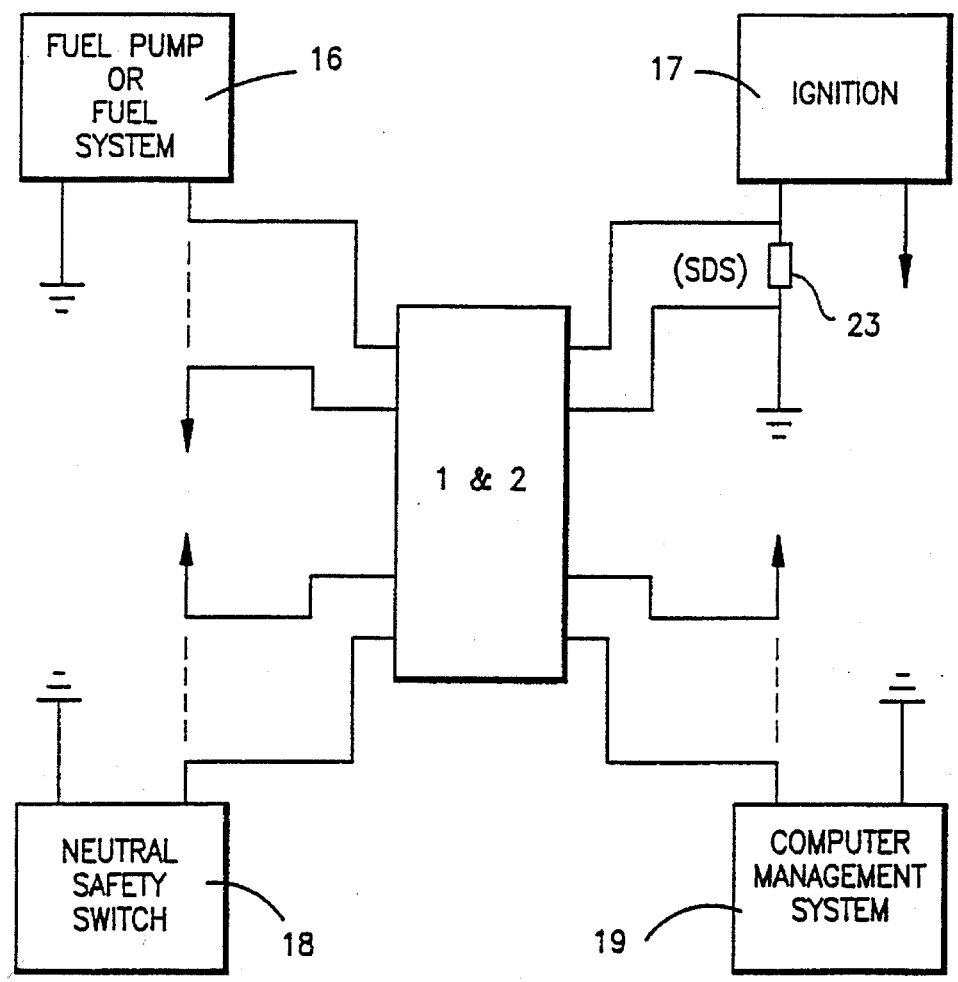
FIG. 3 illustrates a circuit diagram of the present invention showing four circuits to be broken.

The insertion of the male key into the female socket and connection of the mating contacts therein provides for electrical connections between pairs of contacts on the female socket and four or more electrical circuits existing in the vehicle to be protected. The choice of socket contact pairs is determined by the four pairs created on the male key in such a manner as to provide completed circuits when the male key is inserted into the female socket and provide incomplete circuits when the key is removed from the socket. FIG. 3 illustrates, in block form, the device (female socket 1 and male key 2) interconnecting four electrical circuits. The four electrical circuits shown in FIG. 3 are (1) the fuel pump or fuel system 16, (2) the ignition 17, (3) the park neutral safety switch 18 and (4) the computer management system 19. However, it is to be understood that the present invention is not limited to these particular circuits, as any electrical circuit can be chosen which would impede the proper operation of the vehicle to which the device is installed. Rather, these four circuits are provided only as being illustrative. Additional examples of circuits are the starter motor, ground, automatic transmission, coil and the like.

Since neither the owner or installer knows the coding sequence of the particular security key, after the key is inserted into the female socket, it is necessary to determine and separate the individual circuit pairs which complete each circuit. Once the four circuit pairs have been ascertained, the installer may tie into four automotive systems. As noted above, there are more than four circuits that can be disengaged on any vehicle (car, boat, etc.), so the installer may choose the circuits to break during installation. In other words, the installer determines the completed circuitry prior to installation by inserting the male "key" into the female side, then checking the continuity on the eight wires to determine which combinations of the wires form the completed circuits. It is to be noted that the security key does not replace the factory supplied ignition key, but the vehicle can only be satisfactorily operated when used in conjunction with the factory supplied ignition key.

Figure 6:
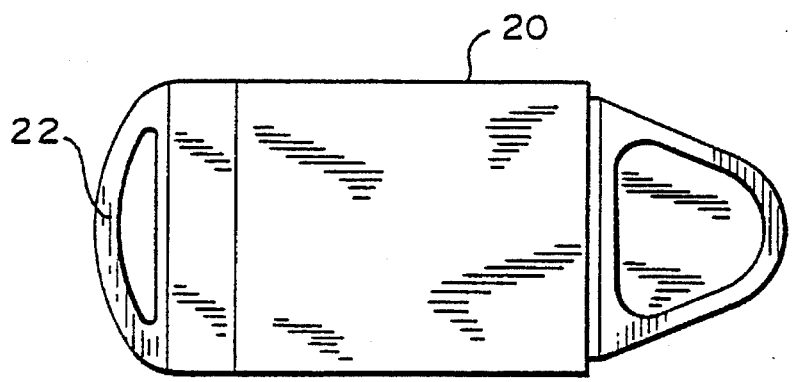
FIG. 6 illustrates a protective carrying case.

A plastic carrying case 20 is provided for storing the key when not in use as shown in FIG. 6. The carrying case is made specifically to encapsulate the key thereby protecting the exposed longitudinal contacts. The carrying case has latches (not shown) to selectively engage notches 21 located on the key. On the end opposite the key receiving opening, a loop 22 can be used to connect the case to a key ring.

In addition to the coded male key 2 and female socket 1 configuration, the vehicle security device of the present invention additionally may comprise a secondary defense system, that is, a second means of thwarting, hampering or otherwise deterring the efforts of a would-be thief. One such secondary defense system (SDS) is illustrated in FIG. 3, wherein element 23 represents a blocking diode which can be tied into one or more circuits to further impede a would-be thief. The diode works such that if it is installed in the opposite direction to the flow of DC current (reverse biased) in any circuit, it will keep that circuit permanently open. This diode is hidden and only two wires from its terminal are accessible. If an attempt is made to conduct a continuity check across these terminals it will cause confusion since depending on how the probes of the test device are connected to the terminals, it registers either a low impedance (e.g. several ohms) or an extremely high impedance (e.g. several mega ohms). The anti-tamper circuit is created by the diode included in one or more circuits which allows a circuit to work properly only when the key is inserted. The gate also allows the key to complete the circuit should the diode ever fail. With the ignition key and device key removed, a thief attempting to trace circuitry will get a false reading through any of the electrical circuits containing the diode. The SDS must be properly installed to complete the total function of the present invention. The SDS will wire into one of the chosen automotive systems as shown in FIG. 3. The SDS also may be wired into any of the other chosen electrical circuits.

Figure 7:
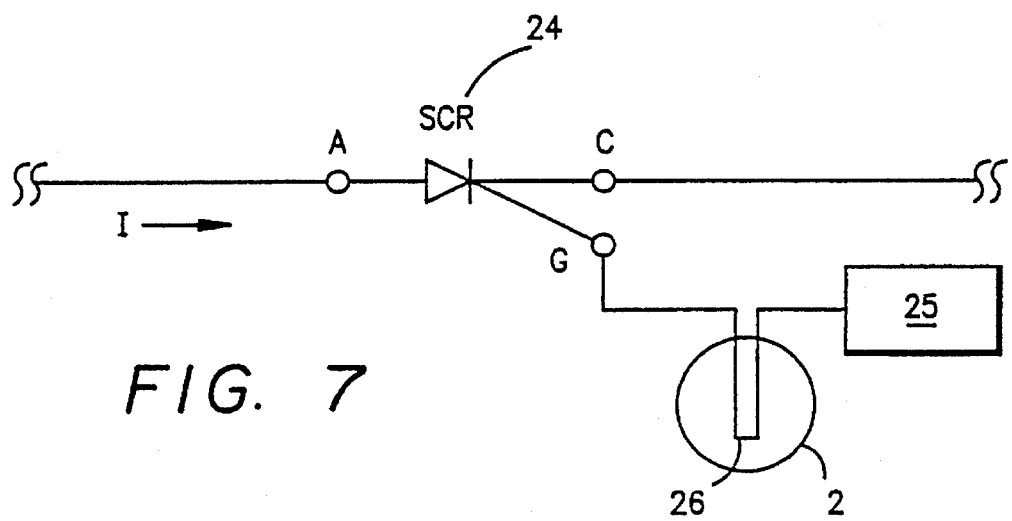
FIG. 7 illustrates a secondary defense system of the present invention.

Another secondary defense system is illustrated in FIG. 7, wherein a silicon-controlled rectifier (SCR) is utilized. The SCR is a four layer device that upon a specific command acts exactly like a diode. As shown in FIG. 7, from the anode A to the cathode C it has the diode symbology except that another lead (gate) G is present. Once the gate voltage goes positive, it enables the device to act like a diode except that it can carry a large amount of current. Once the SCR begins to conduct, it will remain in conduction until the power source is removed. The SCR is installed by breaking any line in the vehicle and inserting the device as shown in FIG. 7. The (gate) G is connected 26 through key 2 to any low voltage system 25 such as elements 16–19 in FIG. 3.

In operation, the present vehicle security device will more successfully discourage theft than prior art devices. It is well known that a potential thief desires to steal a car quickly and easily. A generally known statistic is that it takes about 30 seconds to jump start a vehicle by removing the ignition tumbler and turning on the ignition by means of a screwdriver or similar tool. However, when the present vehicle security device is installed, the motor will not turn over since the circuits have not been completed.

If a potential thief is persistent, he may use the screwdriver to turn on the ignition switch and then insert a "slug" into the protector socket. In this instance (with the present device), all the vehicle circuits will be in a dead short as fuses blow in the vehicle. The thief may attempt to replace the fuses, but the replaced fuses also will be blown. Further, because the female socket is so narrow, having approximately $^{60}/_{1000}$" clearance from top to bottom between the terminal contacts and because the terminal contacts are buried far back from the face plate entry, virtually any attempt by the thief to probe the system in order to "break" it will be unsuccessful. Most likely, after several quick and failed attempts, the thief soon would determine that the vehicle security is too difficult to overcome and depart the scene. Even if the thief has a security key of the present invention, it is very improbable given the hundreds of unique keys, that "his" security key will work. It is acknowledged that the thief's several attempts may cause some minor damage to the vehicle's system and that the thief may blow an SDS diode, if there is no other damage, the owner's correct security key should most often allow him to drive his vehicle after the attempted theft. However, even if the ignition tumbler and possibly some fuses have been damaged, the owner can rest assured knowing that the vehicle has not been stolen and any damage to the system can be easily repaired. Although inconvenient, it is preferable to having a vehicle stolen.

The Embry patent, previously discussed, discloses that the owner will know the "code" of his security key because he will usually do his own installation. In the present invention, the owner or installer does not and can not know which code he's installing. The installer only knows which circuits are used for which contacts but does not know the hidden code on the male key. Quite simply, this means it is virtually impossible for a thief to know that he has the correct security key for the installed device.

ORIGINAL EQUIPMENT MANUFACTURER INSTALLATION

Installation by O. E. M Vehicle Manufacturers that can be activated at dealer level very quickly.

1) Vehicle manufacturer can either include the wiring harness assembly of the present invention within the loom/or include female plug-ins concealed randomly within the loom allowing the wiring harness to "plug-in" to those female connections;

2) Vehicle manufacturer inserts security key into the female socket. The key is held in place by a plastic "clip";

3) The plastic clip also holds an extra key and also clips to retainer well up under dash board of a vehicle;

4) If never "dealer activated", the female connectors remain a permanent part of wiring system at acceptable cost effectiveness to manufacturer;

5) If dealer activates system (for example to prevent theft on sales lot, etc, or as value added to consumer sale), the dealer quickly/easily removes the unit from holding clip, mounts mounting bracket on lower dash bezel or steering column, snaps key/socket unit in place into mounting bracket;

6) Tests second key, activate sale-warranty numbers. Vendor gives instructions, ancillary material, etc., to consumer purchaser.

The above will afford the least expensive way to offer dealer activated maximum protection on every vehicle manufactured by the maker and also gives each retailer the least expensive, quickest and easiest method of offering superior theft protection to his dealership and customers.

A system and method has been shown in the above embodiments capable of preventing the theft of various vehicles. While various preferred embodiments have been shown and described, it will be understood that there is no intent to limit the invention by such disclosure, but rather, is intended to cover all modifications and alternate constructions falling within the spirit and scope of the invention as defined in the appended claims.

What is claimed is:

1. A vehicular security system comprising:

a key having a first and second side;

said key having longitudinal contacts;

said longitudinal contacts selectively connectable on each of said first and second side in a first connection;

said key additionally comprising one or more feed through holes for selective connection of said longitudinal contacts between said first and second side in a second connection;

said first and second connections being arranged in a plurality of predetermined configurations, said configurations corresponding to a plurality of unique security codes;

a key receiving means, including receiving contacts, for receiving said key;

said key receiving means connecting one or more electrical devices located within the vehicle;

said key containing at least one of a plurality of predetermined security codes, and wherein said key is selectively inserted into said receiving means to form an electrical connection between vehicle electrical circuits.

2. A vehicular security system as per claim 1, wherein said first and second sides of said key make simultaneous contact with said receiving contacts within said key receiving means.

3. A vehicular security system as per claim 1, wherein said contacts are selectively connected by variable combinations of said first and second connections and wherein said connections are concealed from view.

4. A vehicular security system as per claim 1, wherein said receiving means includes at least one thyristor to produce false readings during tampering.

5. A vehicular security system as per claim 1, wherein said receiving means has an exterior opening for receiving said key and wherein said receiving contacts are distanced from said opening to reduce ease of tampering.

6. A vehicular security system as per claim 5, wherein said receiving contacts are arranged in a plurality of closely spaced rows to reduce ease of tampering.

7. A vehicular security system as per claim 5, wherein said exterior opening and said key have reciprocally mating longitudinal guides providing for a nonreversible correct orientation of said key when inserted.

8. A vehicular security system as per claim 1, wherein said key receiving means has a serrated exterior to engage a reciprocally mating serrated mounting bracket in a locking manner.

9. A vehicular security system as per claim 1, wherein said electrical devices may be any of at least an ignition, fuel pump, neutral safety switch or computer management systems.

10. A vehicular security system, as per claim 1, wherein:

said key receiving means receives said key during an original installation of said security device, said electrical devices being connected to said receiving contacts to selectively enable and therefore activate said security device, and whereby said security codes remain undisclosed during said installation.

11. A vehicular security system comprising:

a double sided security key comprising a plurality of longitudinal contacts with feed through hole connections connecting a first and second side of said double sided security key;

said longitudinal contacts and said feed through hole connections being connected in various configurations to encode the key;

a key receiving means, including receiving contacts, for receiving said encoded double sided key;

said key receiving means selectively completing a circuit of one or more electrical devices located within the vehicle by reciprocally mating the contacts of said encoded double sided key, and wherein said key is selectively inserted into said receiving means to connect vehicle electrical circuits.

12. A vehicular security system as per claim 11, wherein said first and second sides of said encoded double sided security key make simultaneous contact while reciprocally mating with interior contacts located within said key receiving means.

13. A vehicular security system as per claim 11, wherein said contacts are selectively connected by variable combinations on said first and second sides in combination with selective feed through hole connections.

14. A vehicular security system as per claim 11, wherein said receiving means includes at least one thyristor to produce false readings during tampering.

15. A vehicular security system as per claim 11, wherein said receiving means has an exterior opening for receiving said key and wherein said receiving contacts are distanced from said opening and are arranged in a plurality of closely spaced rows to reduce ease of tampering.

16. A vehicular security system as per claim 11, wherein said key receiving means has a serrated exterior to engage a reciprocally mating serrated mounting bracket in a locking manner.

17. A vehicular security system as per claim 11, wherein said electrical devices may be any of at least an ignition, fuel pump, safety switch or computer management systems.

18. A vehicular security system as per claim 11, wherein said key receiving means and said key have reciprocally mating guides providing for correct orientation of said key when inserted.

19. A vehicular security system comprising:

a security key comprising one or more printed circuit boards having contacts on each of a first and second side of said security key with feed through hole connections;

said contacts on each of said first and second sides of said security key being connected in various configurations on each side and between sides to encode the key;

a key receiving means for receiving said encoded key;

said key receiving means selectively completing a circuit of one or more electrical devices located within the vehicle by reciprocally mating the contacts of said encoded key, said receiving means including at least one blocking means to produce false readings during tampering, and wherein said key is selectively inserted into said receiving means to connect vehicle electrical circuits.

20. A vehicular security system as per claim 19, wherein said contacts of said security key are selectively connected by soldering.

21. A vehicular security system as per claim 19, wherein said blocking means comprises at least one thyristor to produce false readings during tampering.

* * * * *